United States Patent [19]

Ishikawa et al.

[11] Patent Number: 5,661,544
[45] Date of Patent: Aug. 26, 1997

[54] EXPOSURE CORRECTING METHOD FOR A PHOTOGRAPHIC PRINTER AND PHOTOGRAPHIC PRINTING APPARATUS

[75] Inventors: Masazumi Ishikawa; Tohru Tanibata, both of Wakayama-ken, Japan

[73] Assignee: Noritsu Koki Co., Ltd., Wakayama, Japan

[21] Appl. No.: 556,512

[22] Filed: Nov. 13, 1995

[30] Foreign Application Priority Data

Nov. 11, 1994 [JP] Japan .................. 6-277933

[51] Int. Cl.⁶ .................................. G03B 27/72
[52] U.S. Cl. ................................................ 355/41
[58] Field of Search ............................ 355/41, 67, 40, 355/77, 38

[56] References Cited

U.S. PATENT DOCUMENTS

| | | | |
|---|---|---|---|
| 4,751,377 | 6/1988 | Ishizaka et al. ............ | 355/67 X |
| 4,897,672 | 6/1990 | Horiuchi et al. ............ | 346/107 R |
| 5,160,837 | 11/1992 | Hirane et al. ............... | 250/208.2 |
| 5,337,119 | 8/1994 | Tanibata ....................... | 355/40 |

*Primary Examiner*—Arthur T. Grimley
*Assistant Examiner*—David A. Lane
*Attorney, Agent, or Firm*—Wenderoth Lind & Ponack

[57] ABSTRACT

A digital exposure device which performs the exposure to a dot pattern of light comprises:

- scanner 6 for reading density of each dot in the dot pattern on the photosensitive material exposed to predetermined pattern of test image;
- a correction circuit 74 for comparing the read density of each dot and the density of a pattern of test image and for delivering a correction data; and
- a converter circuit 72 for converting the conversion condition according to the correction data.

5 Claims, 3 Drawing Sheets

EXPOSURE CORRECTING METHOD FOR A PHOTOGRAPHIC PRINTER AND PHOTOGRAPHIC PRINTING APPARATUS

BACKGROUND OF THE INVENTION

The present invention relates to an exposure apparatus for use in a photographic printer, and more specifically, to a technique of correcting variations in the intensity of exposure light caused by deterioration with time of the performance of a component or namely, PLZT element in a digital exposure device which performs the exposure to a dot pattern of light.

In a conventional digital exposure device provided with a PLZT shutter, a given exposure requirement for each dot is translated into an exposure control signal which is then fed to a corresponding PLZT element for optimum exposure action.

It is however known that the PLZT element after a long service is declined in the performance causing an improper exposure action. Since the deterioration with time is not uniform among a plurality of the PLZT elements, its correction will be difficult.

For overcoming such a disadvantage of the PLZT shutter that a desired degree of optical density is hardly reproduced due to the deterioration with time, systems have been developed in which each PLZT element is examined for a degree of deterioration and an exposure correction signal is produced according to the degree of deterioration and fed to the PLZT for correction.

Among of them is an exposure device in which a sensor assigned to each PLZT element of the PLZT shutter is responsive to an output of light from the PLZT for producing and delivering a detection signal which is then used to modify the exposure control signal for the PLZT element so that declination of the exposure action caused by the deterioration with time of the PLZT element can be prevented.

The drawback of such a conventional exposure device is that a considerable number of the sensors have to be mounted to their respective PLZT elements of the PLZT shutter. This causes the PLZT shutter to have a more complex construction and will increase the overall cost of the exposure device.

It is an object of the present invention to provide a method of detecting and correcting a declination in the performance of each PLZT element without changing the substantial arrangement of a known PLZT shutter and also, an apparatus embodying the method.

SUMMARY OF THE INVENTION

As defined in claim 1 of this application, an exposure correcting method according to the present invention is provided for use with a photographic printing apparatus including an exposure controller for translating a given exposure requirement into an exposure control signal according to a predetermined conversion condition, an exposure station responsive to the exposure control signal for exposing a photosensitive material to a dot pattern of light on a dot-by-dot basis, and a development station for developing the photosensitive material exposed at the exposure station, and more particularly, comprises the steps of: reading the density of each dot in the dot pattern on the photosensitive material; comparing the density of the dot with the exposure requirement of the dot pattern; and correcting the conversion condition in the exposure controller according to a result of the comparing action.

According to claim 2, the step of correcting the conversion condition in the exposure controller, specified in claim 1, is performed whenever the printing to the photosensitive material exceeds a predetermined length of time.

Also, according to claim 3, the step of correcting the conversion condition in the exposure controller is performed whenever the printing to the photosensitive material exceeds a predetermined length of the material.

As defined in claim 4, a photographic printing apparatus according to the present invention comprises: an exposure controller for translating a given exposure requirement into an exposure control signal according to a predetermined conversion condition; an exposure station responsive to the exposure control signal for exposing a photosensitive material to a dot pattern of light on a dot-by-dot basis; a development station for developing the photosensitive material exposed at the exposure station; a read station for reading the density of each dot in the dot pattern on the photosensitive material; a comparing means for comparing the density of the dot with the exposure requirement of the dot pattern; and a condition correcting means for correcting the conversion condition in the exposure controller according to a result of the comparing action.

According to the exposure correcting method of claim 1 for use with such a photographic printing apparatus including the exposure controller for translating a given exposure requirement into an exposure control signal according to a predetermined conversion condition, the exposure station responsive to the exposure control signal for exposing a photosensitive material to a dot pattern of light on a dot-by-dot basis, and the development station for developing the photosensitive material exposed at the exposure station, the density of each dot of the dot pattern on the photosensitive material which is compared with the exposure requirement can be read when the dot pattern has been developed and the exposure station will thus need not to be modified.

Using the method of claim 2, the step of correcting the conversion condition in the exposure controller is performed whenever the printing to the photosensitive material exceeds a predetermined length of time, hence ensuring the exposure actions of a uniform quality.

Using the method of claim 3, the step of correcting the conversion condition in the exposure controller is performed whenever the printing to the photosensitive material exceeds a predetermined length of the material, thus ensuring the exposure actions of a uniform quality.

In the photographic printing apparatus of claim 4, after the given exposure requirement is translated into an exposure control signal according to a predetermined conversion condition and the photosensitive material is exposed to a dot pattern of light on a dot-by-dot basis and developed, the density of each dot in the dot pattern on the photosensitive material is read by the read station and compared with the exposure requirement of the dot pattern. Then, the result of the comparison is used to correct the conversion condition in the exposure controller, whereby any deterioration with time of the exposure station will be offset without modifying the simple construction of the exposure station for producing a higher quality image of dots.

DETAILED DESCRIPTION OF THE PREFERRED EMBODIMENT

One embodiment of the present invention will be described in the form of an exposure apparatus in a photographic printer, referring to the accompanying drawings.

Figure 1:
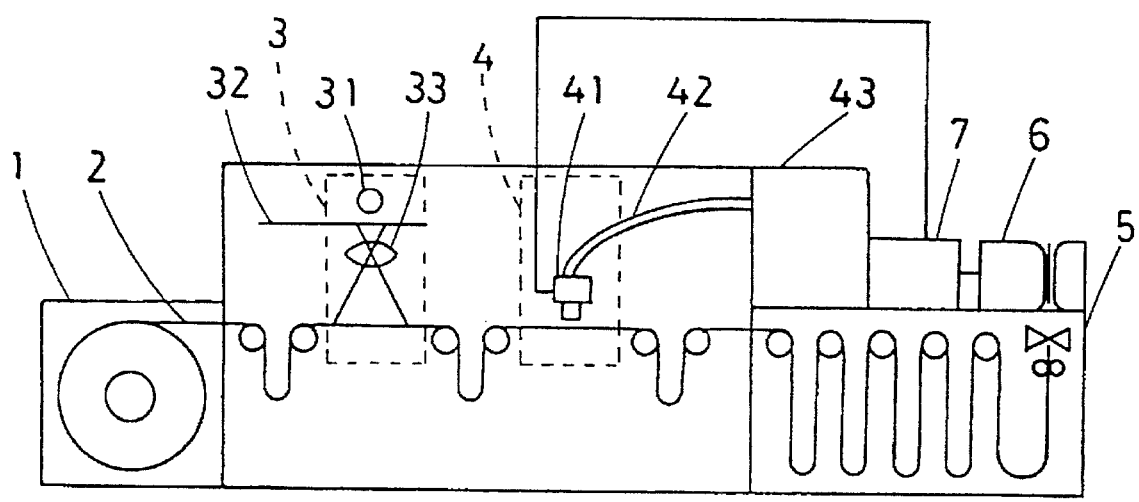
FIG. 1 is an overall schematic view of a photographic printer provided with an exposure apparatus according to the present invention.
Figure 2:
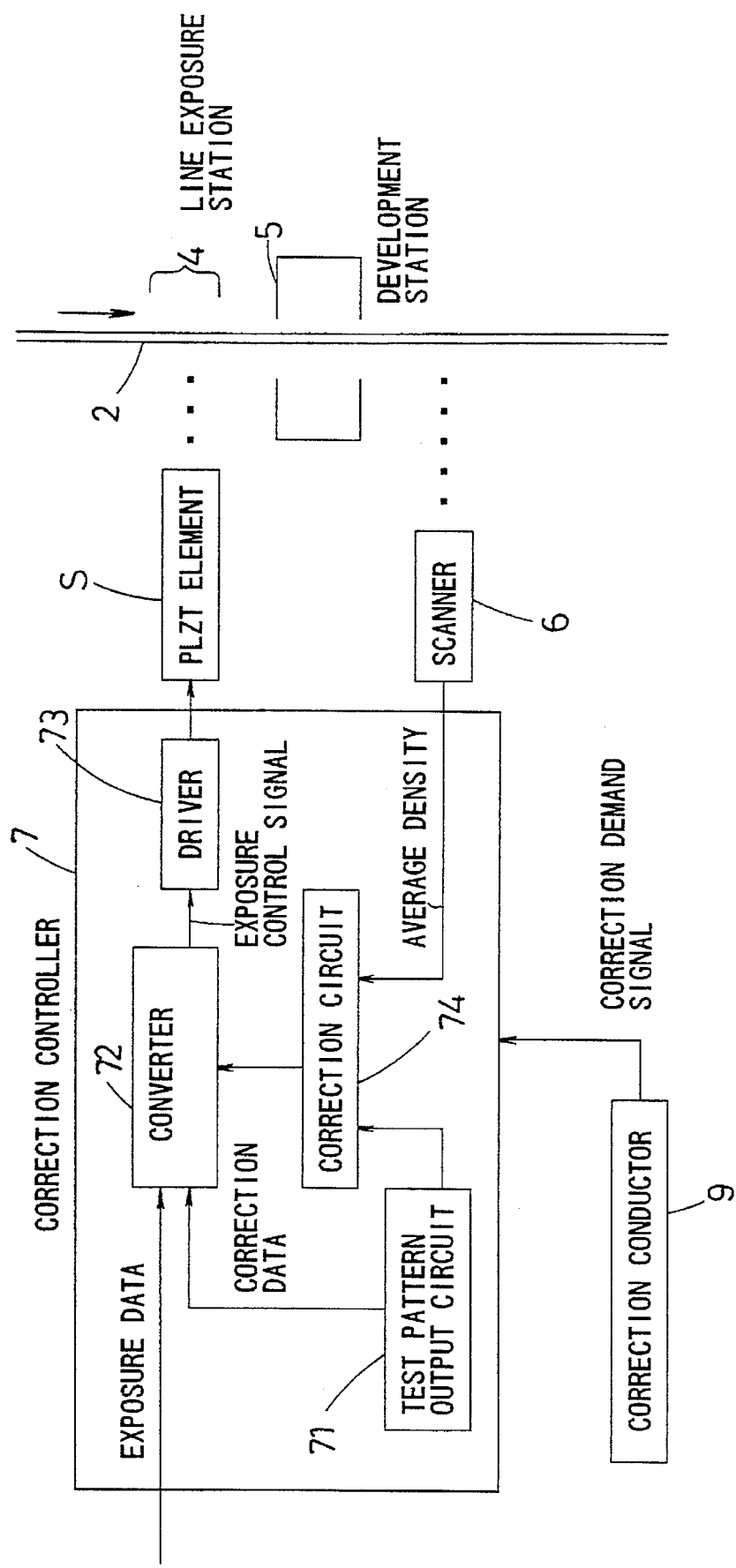
FIG. 2 is a block diagram showing a primary part of the photographic printer.

FIG. 1 is an overall schematic view of the photographic printer and FIG. 2 is a block diagram showing a primary part of the same.

As shown in FIG. 1, there are provided a magazine 1 for supply of a printing paper 2 of photosensitive material, a negative exposure station 3 for projecting an image on a negative film, a line exposure station 4 for projecting a digital image, a development processor 5 for developing process of the exposed printing paper 2, a scanner 6, and a correction controller 7.

At the negative exposure station 3, an image on the negative film 32 is irradiated by light from a lamp 31 and focused by a lens 33 on the printing paper 2 for exposure action.

As shown in FIGS. 1 and 2, the line exposure station 4 allows the printing paper 2 to be exposed to a pattern of a digital image read with another scanner or produced by an electronic device such as a computer to be projected onto the printing paper 2.

The line exposure station 4 comprises a PLZT shutter 41 having rows of PLZT elements, denoted by S in FIG. 2, extending widthwisely of the printing paper 2, a bundle of optical fiber lines 42 for transmission of light to the PLZT elements, and a PLZT light source 43 for directing an intensity of light to the optical fiber bundle 42.

The development processor 5 is provided where the printing paper 2 exposed at the negative exposure station 3 and/or the line exposure station 4 is subjected to developing process and cut into frames before discharged.

The correction controller 7 comprises a test pattern output circuit 71 for delivering a pattern of test image for examining a profile of optical density, a converter circuit 72 for producing an exposure control signal through conversion in response to exposure data of a digital image, a driver circuit 73 for actuating a corresponding group of the PLZT elements S with a specific combination of voltage and duration determined by the exposure control signal, and a correction circuit 74.

The scanner 6 is a linear image sensor having a plurality of read elements, similar to the PLZT elements S, arranged in a row widthwisely of the printing paper 2.

FIG. 2 illustrates an assembly of the components for a single dot. In practice, the assemblies are installed as equal in number to the dots in one row to be printed width-wisely on the printing paper 2. In case of a color image, the scanner 6 may measure the density of each dot of B, G, and R colors. The exposure data can thus be corrected according to measurements of the density. Preferably, the pattern of test image is in gray color.

When the pattern of test image represents exposure conditions, it is assumed that the converter circuit 72 is an exposure controller, a set of the PLZT light source 43, driver circuit 73, and PLZT shutter 41 is an exposure station, the scanner 6 is a read device, and the correction circuit 74 is a condition correcting means.

The converter circuit 72 in the correction controller 7 is normally operated in a printing mode where the exposure data of a digital image read with another scanner or produced by a computer is received and used for controlling the action of the line exposure station 4 before the printing paper 2 is subjected to the development process and cut into prints.

The action of the correction controller 7 is triggered by a correction demand signal which is produced by a correction conductor 9 equipped with a timer and delivered as soon as the preceding printing duration set by the timer is ended or upon a transfer sensor in the conveying means detecting the completion of advancing movement of the printing paper 1.

After the correction demand signal is released, it is confirmed that the printing of a current image of the negative has been finished and then, the action is shifted to a correction mode.

Figure 3:
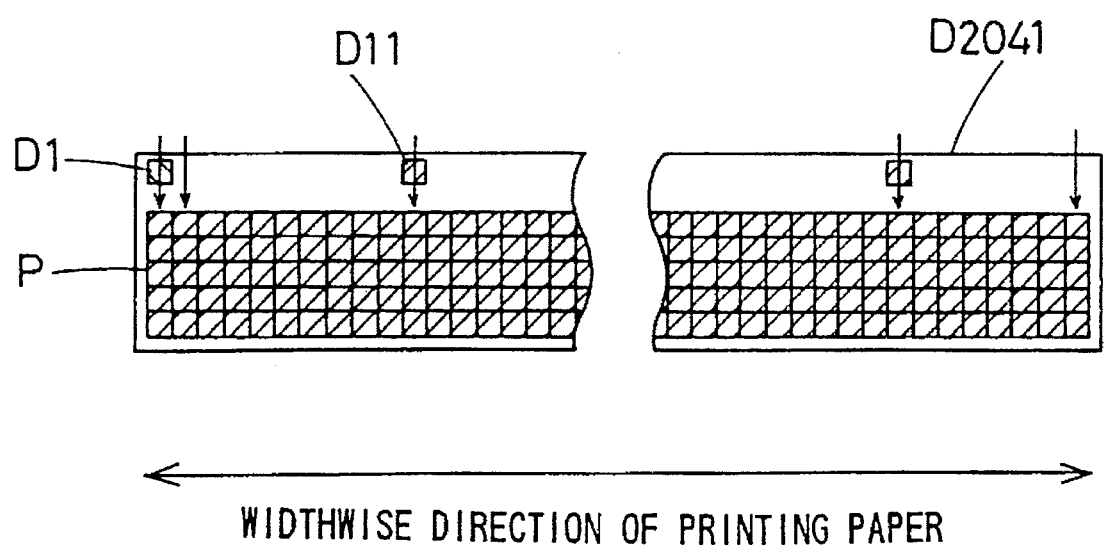
FIG. 3 is a diagram showing a pattern of test image produced in the photographic printer.

In the correction mode, a pattern of test image such as shown in FIG. 3 is supplied from the test pattern output circuit 71 to the converter circuit 72 for appropriate exposure action before the development process.

Referring to FIG. 3, D1 represents a reference dot indicating the location of the first dot in the test pattern, D11 is a reference dot indicating the location of the eleventh dot, and D2041 is a reference dot indicating the location of the 2041th dot. More particularly, the reference dots D1, D11, . . . , D2041, . . . are provided at equal intervals of 10 dots. P represents an image of a uniform density consisting of dots, 2048 wide by 5 long, on the printing paper.

This pattern of test image is developed and can thus be read with the scanner 6. In reading, the pattern of test image is divided into dots of densities as retrieved by the row of the PLZT elements S under guidance of the reference dots D1, D11, . . . D2041, and so on.

The densities of each succession of five dots aligned lengthwisely of the printing paper 2 are averaged and a resultant average density is designated as a characteristic value of the PLZT element.

The characteristic value of every five dots is fed to the correction circuit 74 where it is compared with the density of the darkest or least light transmission of the dots to determine the correction data corresponding to a comparison ratio.

More specifically, a density d read with the scanner 6 is divided by an intrinsic factor k of the printing paper to have an intensity of light i (=d/k) where d, k, and i are logarithmic numbers.

Then, a ratio s to an intensity of light ii of the darkest dot is calculated ($=10^i/10^{ii}$). The correction data c (=1/s) is given from the ratio s.

The correction data is transferred to the converter circuit 72 which in turn modifies the conversion characteristic (commonly, an amplification factor) of the corresponding PLZT element S.

As deteriorated ones of the PLZT elements are corrected in the characteristic, the exposure action will be returned to its initial condition.

If the entire PLZT elements are deteriorated simultaneously but not respectively or the intensity of light from the light source is declined, the pattern of test image may directly be transferred from the test pattern output circuit 71 to the correction circuit 74 where it is compared with data of the density supplied from the scanner 6 to determine a correction data. It is then preferred that the pattern of test image is temporarily stored in the correction circuit 74 and used for comparison with the density data yielded by retrieving a printed and developed form of the test pattern with the scanner 6.

The exposure correcting method of the present invention may produce a correction data by reading with a separate device an image of data which has been printed by a conventional photographic printer.

We claim:

1. A method for correcting the exposure quality of a photographic printing apparatus including a plurality of elements for exposing a plurality of light beams onto a photosensitive material according to exposure control signals, and a development station for developing the areas of the photosensitive material upon which light beams were exposed, said method comprising the steps of:

reading the density of each area of the photosensitive material upon which light beams have been exposed and developed;

comparing the densities read for each area of the photosensitive material corresponding to each particular element with the densities of a test pattern, to obtain correction data for each particular element;

inputting exposure data of a digital image; and converting the exposure data into said exposure control signals for each particular element in accordance with said correction data.

2. A method for correcting the exposure quality in a photographic printing apparatus as recited in claim 1, wherein the steps of said reading and said comparing are performed when a set duration of time of printing to the photosensitive material is reached.

3. A method for correcting the exposure quality in a photographic printing apparatus as recited in claim 1, wherein the steps of said reading and said comparing are performed when a set length of the photosensitive material has been printed.

4. A photographic printing apparatus comprising:

a plurality of elements for exposing a plurality of light beams onto a photosensitive material according to respective exposure control signals;

a development station for developing areas of the photosensitive material upon which light beams have been exposed and developed;

a reading means for reading the density of each area of the photosensitive material upon which light beams were exposed and developed;

a comparing means for comparing the densities read for each area of the photosensitive material corresponding to each particular element with the densities of a test pattern, to obtain correction data for each particular element;

an inputting means for inputting exposure data of a digital image; and a converting means for receiving and converting the exposure data into said exposure control signals for each particular element in accordance with said correction data.

5. A photographic printing apparatus as recited in claim 4, wherein said plurality of elements are a plurality of PLZT elements of a PLZT shutter.

* * * * *